Feb. 24, 1953  W. A. HELSTEN  2,629,464
BRAKE ROTOR
Filed July 15, 1949

INVENTOR.
Wesley A. Helsten
BY
Atty.

Patented Feb. 24, 1953

2,629,464

UNITED STATES PATENT OFFICE 2,629,464

BRAKE ROTOR

Wesley A. Helsten, Chicago, Ill., assignor to American Steel Foundries, Chicago, Ill., a corporation of New Jersey Application July 15, 1949, Serial No. 105,030

1 Claim. (Cl. 188—218)

This invention relates to brakes and more particularly to a brake disk or rotor adapted for connection to an associated rotating member whereby said member may be decelerated by friction means applied to the rotor.

A general object of the invention is to devise a rotor of the centrifugal blower type wherein air is drawn between spaced annular friction plates of the rotor and thrown radially outward by means of blades extending between the plates.

The invention comprehends the construction of a rotor as a single casting of simple, economical design wherein the parts are arranged to meet maximum stress conditions encountered in use and also permitting convenient manufacturing practice.

More specifically, the invention contemplates the provision of a rotor including a brake ring comprising two plates with integral blades therebetween, one of the plates and certain blades being formed integral with a flange of the support member to provide an exceptionally strong structure.

A different object is to form and arrange the flange of the support member and the blades connected thereto in such manner as to accommodate expansion and contraction between the brake ring and the support member.

A further object is to arrange the blades in such manner as to channel the air to the areas of the rotor where most needed.

These and other objects of the invention will become more apparent from the specification and the drawings, wherein.

Figure 1:
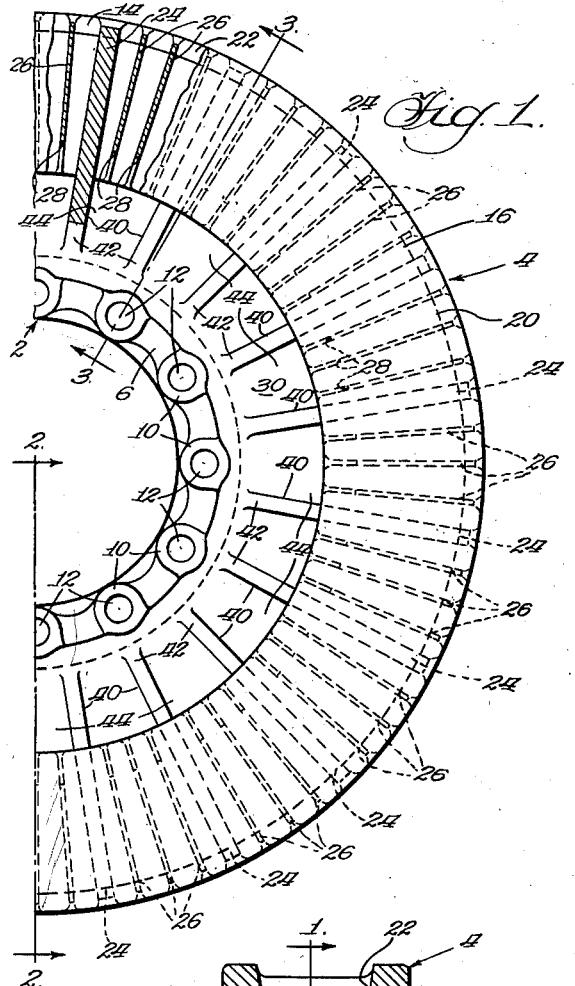
Figure 1 is a side elevational view of one half of my novel rotor, partly in section, the section being taken substantially in the radial plane indicated by line 1—1 of Figure 3.
Figure 2:
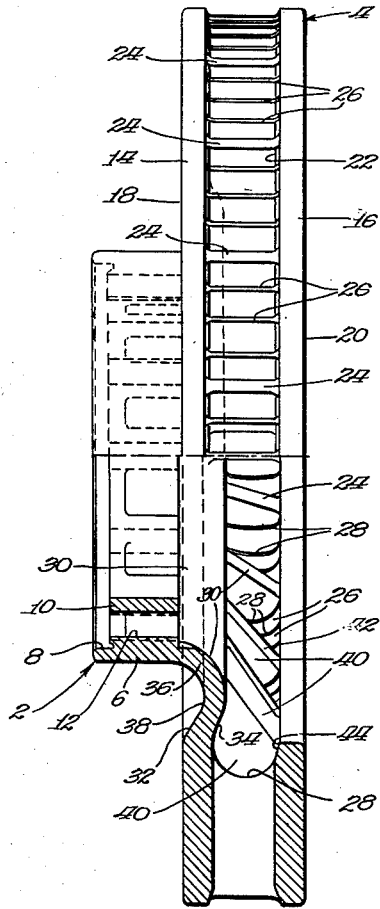
Figure 2 is an edge elevational view, partly in section, the section being taken on the line 2—2 of Figure 1.

Describing the invention in detail, the rotor is a single casting and in general comprises a support member 2 and a brake ring 4.

The support member includes a generally cylindrical hub 6 provided with a bore 8 adapted to receive a portion of a rotating member, such as a wheel (not shown) for mounting the rotor, the hub having a plurality of bosses 10, 10 at the inner end of the bore with openings 12, 12 through which may extend bolts (not shown) for securing the rotor to said rotating member, as well understood in the art.

The brake ring 4 comprises two spaced annular friction plates 14 and 16 arranged in approximately parallel relationship and presenting radial braking faces 18 and 20, respectively, on their remote sides and defining a fluid chamber 22 therebetween within which are disposed a plurality of circumferentially spaced radially arranged blades or vanes 24, 24 and 26, 26, each blade extending transversely of said plates and being formed integral with both thereof. It will be observed from a consideration of Figure 1 that the blades 24, 24 are substantially equally spaced circumferentially of the brake ring and are preferably about three times thicker than blades 26, 26, said blades 24, 24 being thinner than plates 14 and 16, preferably about half as thick.

The blades 26, 26 are arranged in approximately equally spaced groups of three, each group being disposed between two blades 24, 24, the blades 26, 26 of each group being substantially equally spaced. The inner ends of the blades 26, 26 are terminated at approximately the inner perimeters of plates 14 and 16 and are formed with substantially semicircular recesses as at 28 between the plates for a purpose hereinafter described.

The brake ring 4 is connected to the support 2 by means of an integral outturned flange or web 30 on the inner end of hub 6, said web 30 merging at its outer periphery with the inner perimeter of the brake ring plate 14.

The web 30 is curved transversely inwardly of the brake ring to accommodate contraction and expansion of the brake ring relative to the support without overstressing the web. To this end the web 30 is also tapered transversely of the rotor radially inward as at 32 and 34 from its outer extremity to an area intermediate its radially inner and outer peripheries and is then formed of substantially constant reduced section at 36 which extends to its inner perimeter and merges with the inner end of the hub. It will be observed that web 30 is curved as at 38 at its reduced section to provide maximum flexibility.

In order to strengthen the connection between the brake ring and the web 30, the blades 24, 24 are provided with tail or root portions 40 at their inner ends. Each root portion 40 extends beyond the inner extremities of the plates to approximately the inner periphery of web 30 and is formed along its lateral edge adjacent plate 14 integral with the convex side of web 30.

Figure 3:
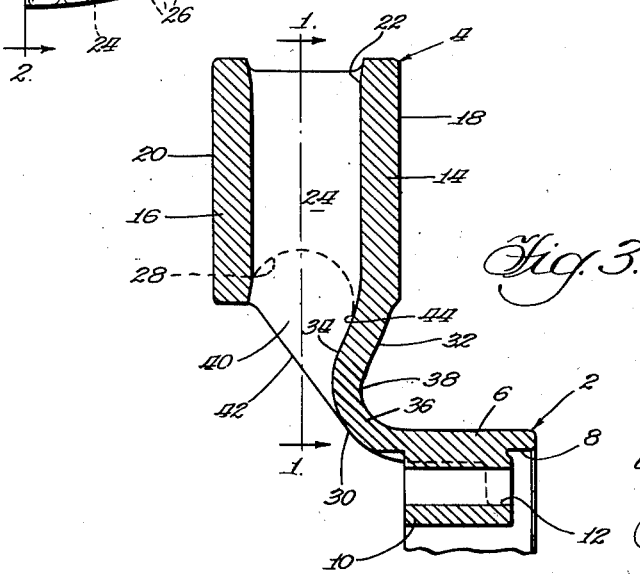
Figure 3 is a sectional view taken on the line 3—3 of Figure 1.

As best seen in Figure 3, the inner end of each root portion 40 is formed with a diagonal inner edge 42 extending transversely of the rotor, the inner end of edge 42 terminating at approximately the inner perimeter of web 30 and the outer end of edge 42 terminating at approximately the inner periphery of plate 16. This arrangement accommodates passage of a maximum amount of air into the inlets 44, 44 defined between the tail portions 40, 40 of adjacent blades 24, 24 and then through chamber 22 and outwardly through the outer periphery of the rotor.

By cutting out blades 26 at 28 the air entering the inlets 44 is caused to strike the tail portions 40 of blades 24 so that a large volume of air is caused to move along blades 24, 24, which is desirable inasmuch as these blades, being thicker, are not capable of conducting the heat generated during braking into the air as rapidly or efficiently at the thinner blades 26. In this respect the greater volume of air moving along blades 24 serves as a compensating factor.

It will be noted that the tail portions 40 and blades 24 are of approximately the same thickness and that these portions 40 are substantially thinner than the reduced section of web 30. This feature accommodates flexing of the web 30 to permit contraction and expansion of the brake ring relative to the support member without overstressing the portions 40 or web 30 and at the same time portions 40 strengthen the connection between the brake ring and the support.

I claim:

A rotor comprising a central support member including a hub and a radial outwardly extending web, a brake ring comprising a pair of plates with integral substantially equally spaced radially arranged blades extending between said plates, all of said blades being thinner than said plates, certain of said blades being thicker than the other thereof and substantially equally spaced with respect to each other and having root portions extending radially inwardly of the inner peripheries of said plates and merging along one of their radial edges with the adjacent side of said web, one of said plates being formed integral with the outer periphery of said web, said other blades extending to the inner peripheries of said plates and being formed with semicircular recesses extending from the inner ends thereof between said plates, said web being arcuate axially intermediate its ends and of gradually increasing thickness radially outwardly and merging adjacent its outer edge with one of said plates and being formed thinner than said plates adjacent its inner edge, said root portions being of substantially the same thickness as said certain blades but thinner than said web and being formed at their inner ends with diagonal edges extending transversely of the rotor, the outer end of each edge terminating adjacent the inner periphery of the other of said plates and the inner end of each edge terminating adjacent the inner perimeter of said web, the thinnest portion of said web being aligned with the root portions of the blades axially of the rotor and integrally united with the root portions.

WESLEY A. HELSTEN.

REFERENCES CITED

The following references are of record in the file of this patent:

UNITED STATES PATENTS

| Number | Name | Date |
|---|---|---|
| 2,215,421 | Eksergian | Sept. 17, 1940 |
| 2,255,024 | Eksergian | Sept. 2, 1941 |